(12) United States Patent
Motzer

(10) Patent No.: US 6,206,062 B1
(45) Date of Patent: Mar. 27, 2001

(54) SHANK-TYPE CUTTER OF A HARD MATERIAL

(75) Inventor: Helge Motzer, Donauwörth (DE)

(73) Assignee: Tiagra Hartstoff GmbH, Oberndorf (DE)

( * ) Notice: Subject to any disclaimer, the term of this patent is extended or adjusted under 35 U.S.C. 154(b) by 0 days.

(21) Appl. No.: 09/522,653

(22) Filed: Mar. 19, 2000

(30) Foreign Application Priority Data

Mar. 10, 1999 (DE) .................................................. 199 10580

(51) Int. Cl.[7] .............................. B27C 1/00; B27G 13/00
(52) U.S. Cl. .................... 144/240; 76/108.2; 144/218; 144/329; 408/226; 408/227; 419/5; 419/53
(58) Field of Search ............................ 76/108.2; 144/218, 144/240, 136.1, 329; 408/226, 227; 419/5, 14, 36, 38, 53

(56) References Cited

U.S. PATENT DOCUMENTS

| 612,526 | * | 10/1998 | Morgan | 144/240 |
| 4,470,733 | * | 9/1984 | Marques, Jr. | 144/240 |
| 5,695,304 | | 12/1997 | Ebert . | |
| 5,735,648 | * | 4/1998 | Kleine | 76/108.2 |
| 5,899,642 | * | 5/1999 | Berglöw et al. | 408/226 |
| 5,963,775 | * | 10/1999 | Fang | 76/108.2 |

FOREIGN PATENT DOCUMENTS

| 685485 | 12/1957 | (DE) . |
| 3623176A1 | 1/1988 | (DE) . |
| 297 01 161 | 7/1998 | (DE) . |

* cited by examiner

Primary Examiner—W. Donald Bray
(74) Attorney, Agent, or Firm—Klaus T. Bach

(57) ABSTRACT

In a shaft-type cutter body of hard material including a shaft for mounting the cutter in a chuck and a head including cutting areas with cutting edges disposed around the circumference of the head, the shaft and the head are formed integrally by injection die casting of powdered raw material followed by sintering. The unfinished cutter body includes cutting edge sections with recessed areas adjacent the cutting edge front surface area for receiving wood chips and delimiting the cutting edge surface area and a surface area receding radially inwardly from the rear cutting edge surface area of the cutting edge so as to limit the rear cutting edge surface area.

4 Claims, 1 Drawing Sheet

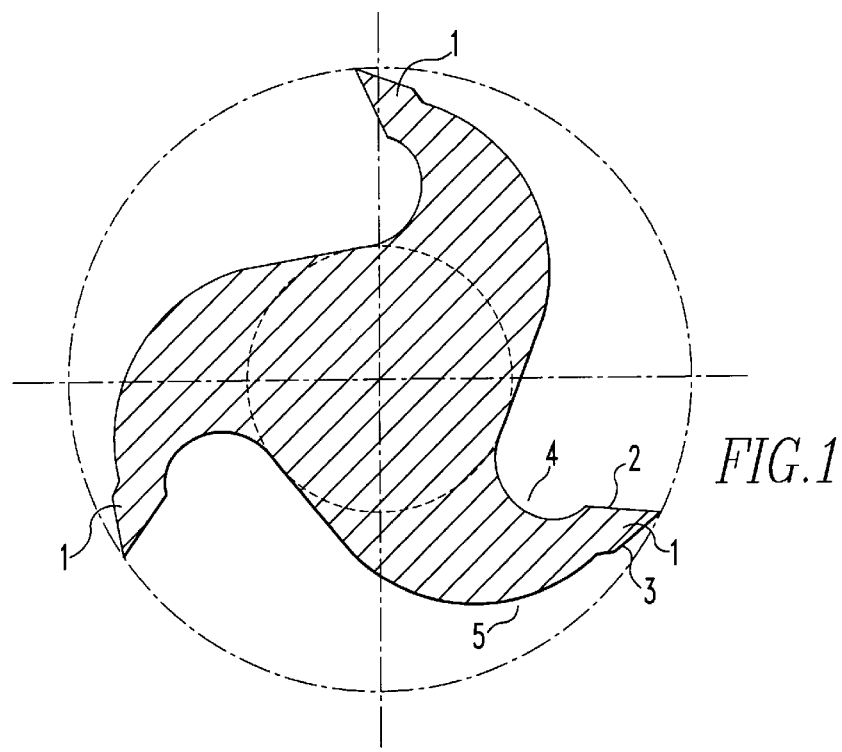
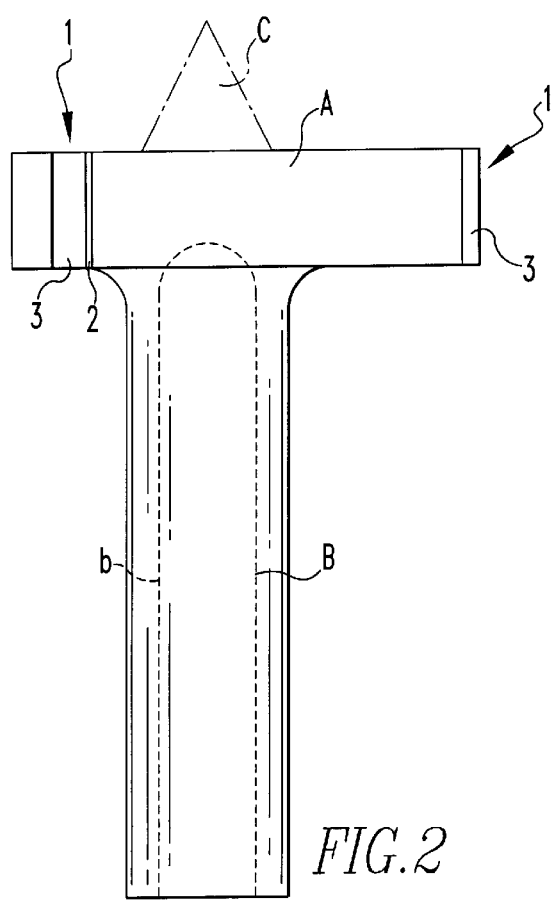

SHANK-TYPE CUTTER OF A HARD MATERIAL

BACKGROUND OF THE INVENTION

The invention relates to a shank-type cutter body of a hard material for the cutting of wood.

Shank-type cutters are used for example for cutting grooves and slots or other recesses into solid wood and also into resin-impregnated pressboard in furniture- window- and door manufacturing operations. These shank-type cutters are often provided with a front cutting end, whereby the shank-type cutter can be introduced into the wooden to be worked in axial direction at one end of a groove or slot to be cut. After the cutter has been advanced axially into the wood to the predetermined depth of the groove or slot to be cut it is moved transverse to the cutter axis, while the cutting edges formed at its circumference are cutting.

It is well-known that the cutting of wood and particularly of pressboards causes substantial wear of the cutting edges of the cutters. The materials used for such cutters are therefore generally hard metal materials in order to obtain a reasonable service life. Since, in these cutters, the cutting edges must extend in a screw-type fashion along the circumference and the axial length of the cutters is a multiple of the diameters of the cutters, the whole shank-type cutter must be made of a hard metal. Tis is in contrast to simple drills or some disc cutters, where the cutting edges may be formed by separate hard metal plates, which are welded onto the cutter body that consists of regular tool steel. The cutters with which the present invention is concerned require therefore extensive grinding particularly for forming the chip accommodating spaces as these spaces need to be ground out of the hard metal shank.

It is the object of the present invention to provide a more simple, faster and substantially less expensive method of manufacturing such shaft-type cutters of hard metal for wood working processes.

SUMMARY OF THE INVENTION

In a shaft-type cutter body of hard material including a shaft for mounting the cutter in a chuck and a head including cutting areas with cutting edges disposed around the circumference of the head, the shaft and the head are formed integrally by injection die casting or of powdered raw material followed by sintering. The unfinished cutter body includes cutting edge sections with recessed areas adjacent the cutting surface for receiving wood chips and delimiting the cutting surface front area and a surface area receding radially inwardly from the rear surface area of the cutting edge so as to limit the rear cutting edge surface area.

Because of the manufacture of the unfinished shaft-type cutter as an injection die-cast shaped unfinished part, which already includes recesses adjacent the edges for accommodating the wood chips, the grinding work can be limited to the cutting edges, so that only a fraction of the grinding operations is needed of what is normally required for the manufacture of this type of shank cutters. As a result, a substantial cost advantage is obtained.

The injection die-casting procedure of manufacturing the unfinished shaped body permits further advantageous modifications in forming the shaft-type cutter according to the invention. In contrast to known shaft cutters, the shaft-type cutter according to the invention may be provided with a hollow shaft, which saves weight and especially material.

As materials for forming the unfinished shaft cutter according to the invention and of course the finished cutter formed from the unfinished cutter by finish grinding, not only hard metal materials, but also ceramic materials may be used. They should all be considered to be covered by the term hard materials as referred to earlier.

An embodiment of the invention will be described below in detail with reference to the accompanying drawings.

BRIEF DESCRIPTION OF THE DRAWINGS

FIG. 1 is a cross-sectional view of the working area, that is, the cutting edges of a shaft-type unfinished cutter body, and FIG. 2 is a side view of the shaft type cutter.

DESCRIPTION OF A PREFERRED EMBODIMENT

The shaft-type cutter or unfinished cutter body consists, as shown in FIG. 2, of a head portion A and a shaft portion B. The head portion A of the unfinished cutter or of the finished shaft-type cutter includes three circumferentially distributed cutting edges 1, each of which has a front edge surface 2 and a rear edge surface 3 as shown in FIG. 1.

As already mentioned, prior art shaft-type cutters of hard metal are cylindrical when unfinished so that the chip accommodating recesses and the cutting edges must be formed by grinding a substantial amount of the hard material out of the unfinished cutter body. In contrast to such conventional procedures, in accordance with the present invention, the unfinished shaft-type cutter body is formed by an injection die casting procedure, whereby the recesses 4 for accommodating the chips during cutting operations are formed and extend under the cutting edge area rearwardly of the front edge surface 2 for the cutting edges which are already roughly formed in the die casting procedure. Also, in the circumferential direction behind the rear surface of each cutting edge area 1, there is a free space 5 formed by a surface area receding radially inwardly from the back face 3 of the cutting edge.

The unfinished cutter body may be formed by injection die-casting, but it may also be formed from powder metallurgical or ceramic base materials by form-pressing and subsequent sintering.

When the unfinished cutter body is formed in the manner as described, only the cutting edges need to be ground to obtain the finished shaft-type cutter. This requires only grinding of the front edge surface 2 and the rear edge surface 3 to form the cutting edge. Because the chip accommodating recess 4 is already formed into the unfinished cutter and extends behind the front edge surface 2 of the cutting edge 1 and the area behind the rear cutting face area 3 of the cutter edge 1 forms a free space 5, which recedes radially inwardly from the surface of the rear cutting face area 3, the surface areas to be ground for forming the cutting edge are relatively small, so that only a small amount of material needs to be removed by grinding. Accordingly, only a small amount of the hard material is wasted and only a small amount of this hard material needs to be ground away which also results in relatively little wear of the grinding tools. Also, only relatively inexpensive flat surface grinders are needed for grinding the front and back edge surfaces 2 and 3.

In addition to the material savings obtained by providing the unfinished cutter already with the recesses, which previously have been ground out of the unfinished cutter body, it is advantageous if, in accordance with the invention, the cutter shaft B is hollow as indicated in FIG. 2 by the dashed line b.

The head A of the shaft-type cutter may be provided with a drill tip C as indicated in FIG. 2 by a dash-dotted line. Furthermore, cutting edges may also be provided at the axial front face of the shaft-type cutter.

What is claimed is:

1. A shaft-type cutter body of a hard material, comprising: a shaft for mounting the cutter in a chuck, a head including a number of cutting edges formed at least at the circumference of said head, said shaft and said head being formed by injection die casting of powdered raw material followed by sintering thereby providing an unfinished cutter body which includes cutting edge sections with front and rear cutting edge surface areas and recessed areas which are disposed adjacent the cutting edge surface areas and extend radially inwardly beyond the front cutting surface area for receiving wood chips and delimiting the front cutting edge surface area, and a free space formed by a surface area receding radially inwardly from the rear surface area of said cutting edge so as to limit the rear cutting edge surface area.

2. A shaft-type cutter body according to claim 1, wherein a drill tip is disposed at the front end of said shaft type cutter.

3. A shaft-type cutter body according to claim 1, wherein said shaft is hollow.

4. A shaft-type cutter body according to claim 1, wherein the front cutting edge surface areas of said cutter and also the rear cutting edge surface areas of said cutter are ground to form the cutting edges of said shaft type cutter.

* * * * *